US012266857B2

(12) United States Patent
Upton et al.

(10) Patent No.: US 12,266,857 B2
(45) **Date of Patent: *Apr. 1, 2025**

(54) WIRELESS TRANSCEIVER HAVING A HIGH GAIN ANTENNA ARRANGEMENT

(71) Applicant: Cambium Networks Ltd, Ashburton (GB)

(72) Inventors: Robert Upton, Ashburton (GB); Varun Hegde, Bangalore K (IN); Michael Wright, Ashburton (GB); Paul Clark, Ashburton (GB); Matt Fuller, Ashburton (GB); Nigel Jonathan Richard King, Ashburton (GB)

(73) Assignee: Cambium Networks Ltd, Devon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,083

(22) Filed: Jun. 13, 2023

(65) Prior Publication Data

US 2023/0327344 A1 Oct. 12, 2023

Related U.S. Application Data

(63) Continuation of application No. 17/443,759, filed on Jul. 27, 2021, now Pat. No. 11,715,885.

(30) Foreign Application Priority Data

Nov. 19, 2020 (IN) ............................ 202021050389
May 19, 2021 (GB) ...................................... 2107164

(51) Int. Cl.
*H01Q 15/16* (2006.01)
*H01Q 19/17* (2006.01)
(Continued)

(52) U.S. Cl.
CPC ........... *H01Q 19/193* (2013.01); *H01Q 15/16* (2013.01); *H01Q 19/17* (2013.01); *H01Q 19/192* (2013.01); *H01Q 21/06* (2013.01)

(58) Field of Classification Search
None
See application file for complete search history.

(56) References Cited

U.S. PATENT DOCUMENTS 3,417,394 A 12/1968 Sauberlich
4,521,783 A 6/1985 Bryans et al.
(Continued)

FOREIGN PATENT DOCUMENTS

BE 668085 A 12/1965
CA 2037555 A 9/1991
(Continued)

OTHER PUBLICATIONS

Frequency Letter Bands, Aug. 2019, Microwaves101.com. Retrieved from the Wayback Machine on Jul. 6, 2022 https://www.microwaves101.com/encyclopedias/frequency-letter-bands (Year: 2019).*
(Continued)

*Primary Examiner* — Dameon E Levi
*Assistant Examiner* — Anh N Ho
(74) *Attorney, Agent, or Firm* — Crowell & Moring LLP

(57) ABSTRACT

A wireless transceiver for a wireless communication network has an offset Gregorian antenna arrangement comprising a primary reflector dish, an electrically conductive reflector member comprising a secondary reflector and a conductive support wall, a planar array of antenna elements arranged as a feed for transmitting radio frequency signals to the secondary reflector and/or for receiving radio frequency signals from the secondary reflector and a conductive support block configured to support the planar array of antenna elements. The conductive support wall is connected directly
(Continued)

to the conductive support block, and the conductive support wall is configured to be substantially perpendicular to the planar array of antenna elements.

14 Claims, 10 Drawing Sheets

(51) Int. Cl.

| | |
|---|---|
| ***H01Q 19/19*** | (2006.01) |
| ***H01Q 21/06*** | (2006.01) |

(56) References Cited

U.S. PATENT DOCUMENTS

| | | | | |
|---|---|---|---|---|
| 4,755,826 | A | 7/1988 | Rao | |
| 6,043,788 | A | 3/2000 | Seavey | |
| 6,081,235 | A * | 6/2000 | Romanofsky | H01Q 3/46 333/156 |
| 6,317,093 | B1 | 11/2001 | Harris | |
| 6,580,399 | B1 * | 6/2003 | Ballinger | H01Q 19/192 343/765 |
| 11,031,700 | B2 * | 6/2021 | Ariumi | H01Q 23/00 |
| 2011/0171901 | A1 * | 7/2011 | Wyler | H01Q 19/17 455/12.1 |
| 2014/0118220 | A1 * | 5/2014 | Ley | H01Q 1/243 343/912 |
| 2017/0005415 | A1 * | 1/2017 | Adada | H01Q 3/20 |
| 2017/0194714 | A1 * | 7/2017 | Fleming | H01Q 21/0025 |
| 2020/0243965 | A1 * | 7/2020 | Lee | H01Q 5/45 |

FOREIGN PATENT DOCUMENTS

| | | | | |
|---|---|---|---|---|
| CA | 2037555 | A1 * | 9/1991 | |
| CN | 2694516 | Y * | 4/2005 | |
| EP | 268363 | A1 | 5/1988 | |
| GB | 2 021 323 | A | 11/1979 | |
| GB | 2021323 | | 11/1979 | |
| KR | 1 0-2020-0092245 | | 8/2020 | |
| WO | WO-02073740 | A1 * | 9/2002 | H01Q 1/247 |
| WO | WO 02/089357 | A1 | 11/2002 | |
| WO | WO-2019231538 | A1 * | 12/2019 | H01Q 1/288 |
| WO | WO-2022103402 | A1 * | 5/2022 | |

OTHER PUBLICATIONS

United Kingdom Intellectual Property Office Search Report issued for Application No. GB 2300417.9 dated Mar. 30, 2023 (4 pp.).

Search Report issued in GB2107164.2 dated Nov. 18, 2021 (5 pages).

International Search Report and Written Opinion of PCT/GB2021/052993 dated May 12, 2022, 15 pages.

Imbriale, William A. et al. "Comparison of Prime Focus and Dual Reflector Antennas for Wideband Radio Telescopes", California Institute of Technology, 4800 Oak Grove Dr., Pasadena, CA 91109.

Frequency Letter Bands, Aug. 2019, Microwaves101.com. Retrieved from the Wayback Machine on Jul. 6, 2022 https://www.microwavest101.com/encyclopedias/frequency-letter-bands (Year: 2019).

* cited by examiner

WIRELESS TRANSCEIVER HAVING A HIGH GAIN ANTENNA ARRANGEMENT

CROSS-REFERENCE TO RELATED APPLICATIONS

This application is a continuation of U.S. patent application Ser. No. 17/443,759, filed on Jul. 27, 2021, which claims priority from Indian Application No. IN 202021050389, filed on Nov. 19, 2020, and also claims priority from Great Britain Application No. GB 2107164.2, filed on May 19, 2021, the entirety of each are hereby fully incorporated by reference.

TECHNICAL FIELD

The present invention relates to a wireless transceiver having a high gain antenna arrangement, and in particular, but not exclusively, to a wireless transceiver for a fixed wireless access wireless communication network, the wireless transceiver having an offset Gregorian antenna arrangement.

BACKGROUND

There is a growing market for wireless systems operating at increasing high frequencies as demand for increased bandwidth continues and as the cost of radio frequency electronic devices falls. In particular for fixed wireless access systems, there is a requirement for radio stations having a high antenna gain, in particular for installation at a subscriber's premises for communication with an access point, typically located on an antenna tower. It is known, for example in the field of professional satellite communication systems, to use a Gregorian antenna arrangement to provide high antenna gain. However, existing Gregorian antenna arrangements are typically not suitable for consumer and commercial applications, which may operate at frequencies of 60 GHz and above, and which need to be compact and low cost while maintaining accurate control of antenna beam direction.

SUMMARY

In accordance with a first aspect of the invention there is provided a wireless transceiver for a wireless communication network, the wireless transceiver having an offset Gregorian antenna arrangement comprising:

a primary reflector dish;

an electrically conductive reflector member comprising a secondary reflector and a conductive support wall;

a planar array of antenna elements arranged as a feed for transmitting radio frequency signals to the secondary reflector and/or for receiving radio frequency signals from the secondary reflector; and a conductive support block configured to support the planar array of antenna elements, wherein the conductive support wall is connected directly to the conductive support block, and the conductive support wall is configured to be substantially perpendicular to the planar array of antenna elements.

This arrangement provides accurate location of the secondary reflector with respect to the planar array of antenna elements. Furthermore, the conductive support wall prevents spurious radiation from the planar array of antenna elements.

In an example, the electrically conductive reflector member is metallic and formed as one piece.

This arrangement provides reduced metallic interfaces thereby reducing sources of passive intermodulation interference.

In an example, the conductive support block has a side face perpendicular to the planar array of antenna elements, the conductive support wall of the electrically conductive reflector member being held against the side face by a fixing member, wherein a protrusion from the side face is configured to limit movement of the conductive support wall in a direction perpendicular to the planar array of antenna elements in a direction towards the primary reflector dish.

This arrangement provides for precise location of the electrically conductive reflector member with respect to the planar array of antenna elements, and in particular allows precise control of the distance between the planar array and the secondary reflector to a small fraction of the wavelength of the radiofrequency transmissions which the Gregorian antenna arrangements is configured to transmit and/or receive. Furthermore, extension of the conductive support wall in a direction away from the secondary reflector beyond the face of the conductive support block avoids an interface aligned with the face of the conductive support block facing the secondary reflector, which may allow spurious radiation.

In an example, the electrically conductive reflector member is formed by casting and the end of the electrically conductive support wall furthest from the secondary reflector comprises a machined surface configured to abutt against a corresponding machined surface of the protrusion, whereby to locate the secondary reflector in a predetermined position with respect to the planar array of antenna elements.

This arrangement allows manufacture of the electrically conductive reflector member to sufficient tolerance to give precise control of the distance between the planar array and the secondary reflector.

In an example, the electrically conductive reflector member is electrically connected to the feed support member.

This arrangement reduces spurious electromagnetic radiation.

In an example, the offset Gregorian antenna arrangement comprises a non-conductive enclosure configured to enclose the electrically conductive reflector member, the planar array of antenna elements, and the conductive support block, and not to enclose the primary reflector dish.

This arrangement confines radiation through the non-conductive enclosure to a small section of the enclosure, which may be made thin-walled without compromising mechanical strength, to reduce radiofrequency signal loss for signals passing through the enclosure.

In an example, the non-conductive enclosure has a thin-walled section directly in the line of sight between the primary reflector dish and the electrically conductive reflector member, the thin-walled section being less than half a wavelength in thickness at an operating frequency of the offset Gregorian antenna arrangement.

This arrangement reduces radiofrequency signal loss for signals passing through the enclosure.

In an example, the focus of the offset Gregorian antenna arrangement is located between the thin walled section of the enclosure and the electrically conductive reflector member.

This allows a reduced size of the thin-walled section, reducing a reduction in the mechanical strength of the enclosure.

In an example, the focus of the offset Gregorian antenna arrangement is located closer to the thin-walled section of the enclosure than to the electrically conductive reflector member.

This allows a particularly reduced size of the thin-walled section, by disposing the thin-walled section in a position in which the radiofrequency radiation is spread over a small area.

In an example, the non-conductive enclosure is composed of polycarbonate.

This material provides a combination of low radiofrequency signal loss and environmental stability.

In an example, the conductive support block is formed as a first end of a feed support member, the feed support member being directly connected, at an end opposite the first end, to a support body configured to support the primary dish.

This arrangement provides for accurate location of the planar array of antenna elements and the secondary reflector with respect to the primary reflector dish, thereby providing predictable alignment between a radiation beam formed by the planar array of antenna elements and the orientation of the antenna arrangement, to facilitate accurate installation by an installer.

In an example, the support body comprises an aperture having an axis parallel to the direction of a radiofrequency main beam which the offset Gregorian antenna arrangement is configured to form, the aperture providing a line of sight along the axis, wherein the aperture is configured to accept a hollow tube and to hold the hollow tube in alignment with the aperture, whereby to allow visual alignment of the offset Gregorian antenna arrangement with another radio station of the wireless communication network.

The hollow tube allows visual alignment of the offset Gregorian antenna arrangement with another radio station of the wireless communication network by an installer, to an accuracy sufficient that the other radio station is within a range of angular directions over which a beam from the antenna arrangement may be electronically steered to provide more accurate alignment of the beam.

In an example. the primary reflector dish is substantially rectangular in plan view, viewed from a direction parallel to the direction of a radiofrequency main beam which the offset Gregorian antenna arrangement is configured to form.

This arrangement has been found to provide a compact design with high radiofrequency gain.

In an example, the planar array of antenna elements is formed as a rectangular array of patch antenna elements on a substrate, wherein the conductive support block is configured to support the substrate.

This arrangement provides accurate location of the array of antenna elements.

In an example, the substrate carries a radiofrequency integrated circuit comprising a beamformer, the radiofrequency integrated circuit being on the opposite side of the substrate from the side on which the array of patch antenna elements is formed, the conductive support plate being provided with a recess to accommodate the radiofrequency integrated circuit.

This arrangement provides effective electromagnetic shielding of the radiofrequency integrated circuit.

In an example, the wireless transceiver is suitable for operation at a frequency of 60 GHz.

The tight tolerances provided by the claimed mechanical arrangement are particularly suited to operation at high frequencies where the wavelength is short and alignment of the parts to a small fraction of the wavelength is typically required.

Further features and advantages of the invention will become apparent from the following description of examples of the invention, which is made with reference to the accompanying drawings.

BRIEF DESCRIPTION OF THE DRAWINGS

In order that the present invention may be more readily understood, examples of the invention will now be described, with reference to the accompanying drawings, in which.

DETAILED DESCRIPTION

Figure 1:
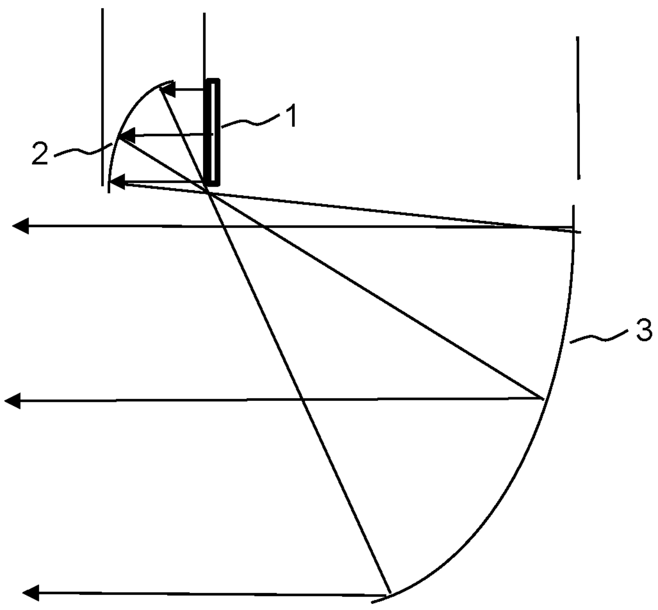
FIG. 1 is a schematic diagram showing the principle of operation of an offset Gregorian antenna arrangement with a planar array of antenna elements as a feed.

Examples of the invention are described in the context of wireless transceiver having a high gain antenna arrangement in the form of a subscriber module for use with a terrestrial fixed wireless access wireless communication system operating in the band of 59-65 GHz. However, it will be understood that embodiments of the invention may relate to other applications and other antenna gains, and to other frequency bands.

The subscriber module in the described example is a high gain subscriber module intended for use in a fixed wireless access wireless communication system comprising an access point, typically located on a tower, and a number of subscriber modules, which may be a mix of high gain and low gain subscriber modules, typically fixed to poles mounted at subscribers' premises, which may be commercial or private residential premises, for example.

In some cases a low gain subscriber module may be installed relatively close to the access point, in which case an antenna arrangement having a lower gain may be sufficient. Such an antenna arrangement may comprise an array of antenna elements, element being connected to a beamformer, which may be in the form of a commercially available beamforming radiofrequency integrated circuit. For example, the array of antenna elements may be an 8×8 array of patch antenna elements spaced apart by approximately a half wavelength. The beamformer may be typically arranged to form a beam selected from a number of pre-configured beams, in an example 120 pre-configured beams. The pre-configured beams may be distributed over an angular sector of approximately +/−40 degrees in azimuth and +/−20 degrees in elevation in one example. In this case, installation of the low gain subscriber module with at least some of the beams in the direction of the access point is relatively straightforward. The best beam for use can be selected by a sweep of possible beams at the subscriber module and then selecting a beam which can be used for communication. A similar process may take place at the access point, which may have a similar antenna arrangement, so that a best beam at the subscriber module and a best beam at the access point can be selected.

However, a subscriber module may be installed further from the access point, for example at distances of 1 km or more. In this case, the high gain subscriber module of this example may be required, due to a greater signal loss due the greater propagation distance.

The high gain subscriber module of this example uses an array of antenna elements and beamformer similar to that used in the subscriber module having lower gain as already described, but the array of antenna elements is used as a feed for an offset Gregorian antenna system. The beam produced by the array of antenna elements is reflected by the secondary reflector of the offset Gregorian antenna system onto the primary reflector dish, to produce a narrower beam from the primary reflector dish than the beam produced by the array. For example, the beam produced by the array may be approximately +/−8 degrees between 3 dB points and the beam transmitted or received by the primary reflector dish may be approximately 0.7 degrees between 3 dB points. This reduced beamwidth gives an improvement in gain, which may provide approximately a 22 dB increase in gain in comparison with the gain of the antenna array alone. The overall gain of the antenna arrangement of the high gain subscriber module may be approximately 44 dBi (deciBels compared to isotropic) for this arrangement.

The high gain antenna arrangement results in a reduction in the angular sector over which a beam may be formed. In the above example, the pre-configured beams may be distributed over an angular sector of approximately +/−2 degrees in azimuth and +/−1 degree in elevation from the primary reflector dish.

As a result of the narrower beams, and the smaller angular sector over which the beams may be steered, the installation process of the high gain subscriber module may be more demanding than for a low gain subscriber module. In order to use the technique of using a scan of the beams to find a best beam, it is necessary to first of all install the subscriber module in an orientation in which the angular sector over which the beams may be steered includes the direction of the access point. To do this, it is important that the relationship between the direction of the beams formed by the antenna arrangement and the body of the subscriber modules is well controlled. To achieve this, it is important that the parts of the offset Gregorian antenna system are kept in the correct relative positions to a fine tolerance. The tolerance is typically a small fraction of the wavelength at the operating frequency of approximately 60 GHz in this example. It has been found that the tolerance of the relative positions of the secondary reflector and the array of antenna elements is of particular importance in controlling the beam direction. For example, a tolerance of 0.5 mm or less may be required.

To hold the secondary reflector in a tightly controlled position relative to the array of antenna elements, the secondary reflector is connected to a block onto which the array of antenna elements is mounted by a conductive plate. The conductive plate may be referred to as a conductive support wall. Typically, the secondary reflector and the conductive support wall are made of metal and formed as one piece, typically by casting. This provides a rigid piece which can be fixed to the block on which the array of antenna elements is mounted, typically by one or more screws attaching it to the side of the block. The distance between the secondary reflector and the block is tightly controlled by providing a protrusion, or stop, on the side of the block. In this example, the end of the conductive support wall has a machined end, and this is held by the screws in a position abutting the stop, which also has a machined surface. The conductive support wall also has the benefit that it stops spurious radiation from the array of antenna elements form being radiated directly from the array. It may be thought that having a conductive object so close to the array and the secondary reflector may adversely affect the radiation pattern produced by the antenna arrangement. The conductive support wall is arranged to be perpendicular to the plane of the array of antenna elements, and in particular, the inner face of the conductive support wall is perpendicular to the plane of the array of antenna elements. It has found that in this orientation of the support wall, any reflections of radiation from the support wall do not adversely affect the radiation pattern of the antenna arrangement. The conductive support wall typically extends across the whole width of the array, closing off any aperture that may otherwise be formed between the secondary reflector and the support block of the antenna array. The support wall is situated close to the array, typically within a distance from the array of a quarter or less of the width or length of the array. The secondary reflector has a double curvature profile on its inner surface, facing the array, which is a section of a parabola in both the horizontal and vertical planes, the vertical plane being the axis of symmetry of the Gregorian antenna arrangement.

The support block for the array of antenna elements in this arrangement forms the end of a rigid cast metallic arm which is connected to the rigid cast metallic body of the transceiver, which supports the radio circuitry. Appropriate wires and coaxial cables are routed through the arm, typically in grooves to give electromagnetic compatibility protection, between the radio circuitry and the beamformer attached to the array of antenna elements. This rigid assembly, and the precision attachment of the secondary reflector in relation to the array, provides a predictable orientation of the beams electronically selected by the beamformer, and allows an installer to have confidence in the orientation of the angular sector through which beams can actually be formed for connection to the distant access point. To allow the installer to line up the high gain subscriber module with the access point, the body of the subscriber module is provided with an aperture, into which a hollow tube may be fixed in a predetermined orientation that is typically aligned with a beam at the center of the sector through which the beams can be steered. Using the hollow tube for visual alignment with the access point, there typically being a line of sight path between the subscriber module and the access point for propagation in the 60 GHz band, allows the installer to reliably orientate the subscriber module sufficiently that the beam searching approach can select a workable beam for communication. Typically the identifier of the beam with the greatest signal strength is fed back from the access point for a transmit beam, or the identifier of the beam having the greatest signal strength received from the access point is noted, for a receive beam. If the selected beam is not at the center of the sector through which beams may be steered, a message may be sent to the installer from a control processor in the wireless network, typically a controller of the access point or the subscriber module, indicating that the orientation should be adjusted in a specified direction to align the center of the sector of beams with the access point. This message may be sent to a user device of the installer. The direction of adjustment may be calculated using the known relationship between the angles of the beams formed by the antenna arrangement and the beam identifiers that are set electronically. Once installed, any movement of the subscriber module on its mount, for example due to wind loading, may be dealt with by reselection of the beams. This is most effective if the initial installation of the subscriber module allows communication using a beam at the center of the angular sector through which beams can be steered.

FIG. 1 is a schematic diagram showing the principle of operation of an offset Gregorian antenna arrangement, having a primary reflector dish 3 and a secondary reflector 2. An array of antenna elements 1 is used to illuminate the secondary reflector 2 with radiofrequency radiation formed into a first beam having a first beamwidth. The amplitude and/or phase of the signals fed to/received from respective elements of the array are arranged to have appropriate values to form a beam of intended direction and beamwidth. The amplitude and/or phase of the signals fed to/received from respective elements is typically controlled by a beamformer implemented by a radiofrequency integrated circuit. The effect of the combination of the primary reflector dish 3 and the secondary reflector 2 is to increase the gain of the first beam, producing a second beam of reduced beamwidth. For example, the first beam may have a beamwidth, measured as being the angular distance between points of the radiation beam that have a gain 3 dB lower than the gain in the center of the beam, of approximately 8 degrees, and the second beam may have a beamwidth of approximately 0.5 degrees. Also, a given deviation of the first beam from a direction perpendicular to the array will result in a smaller deviation in the second beam.

Figure 2:
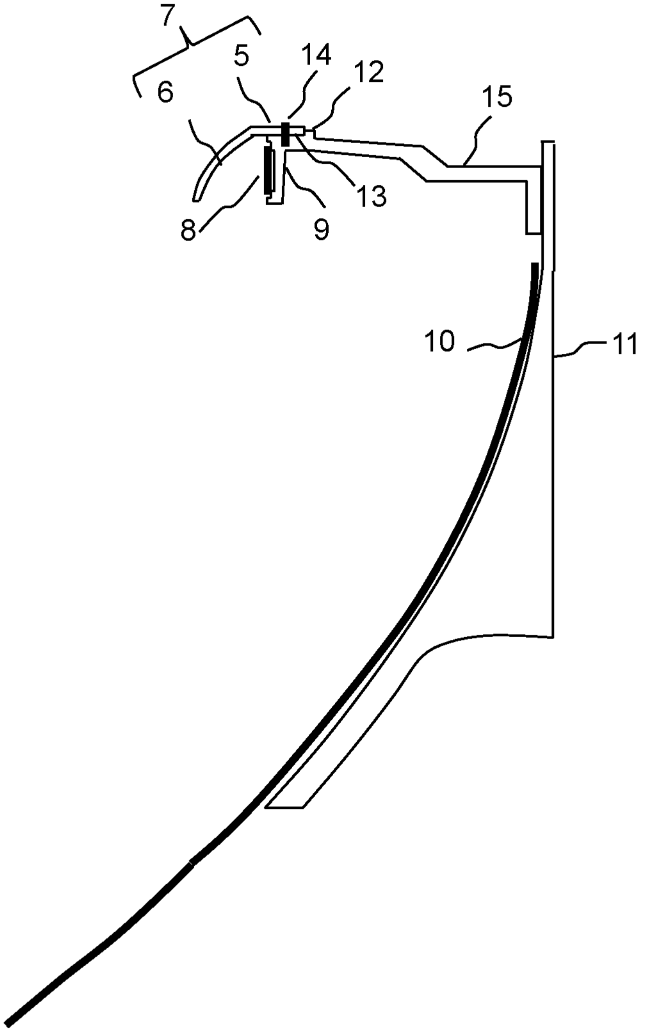
FIG. 2 is a schematic diagram showing an offset Gregorian antenna arrangement in an embodiment of the invention.

FIG. 2 shows an example of an implementation of an offset Gregorian antenna arrangement in the example of a high gain subscriber module. The secondary reflector 6 is provided as part of an electrically conductive reflector member 7 which comprises both the secondary reflector 6 and a conductive support wall 5. A planar array of antenna elements 8 is arranged as a feed for transmitting radio frequency signals to the secondary reflector 6, and/or for receiving radio frequency signals from the secondary reflector 6. A conductive support block 9 is configured to support the planar array of antenna elements 8. In an example of FIG. 2, the conductive support block 9 is formed as a first end of a feed support member 15, the feed support member being directly connected, at an end opposite the first end, to a support body 11 configured to support the primary reflector dish 10. This arrangement provides for accurate location of the planar array of antenna elements 8 and the secondary reflector 6 with respect to the primary reflector dish, providing predictable alignment between a radiation beam formed by the planar array of antenna elements and the orientation of the antenna arrangement.

As can be seen in FIG. 2, the conductive support wall 5 is connected directly to the conductive support block 9. The conductive support wall 5 is substantially perpendicular to the planar array of antenna elements 8. This arrangement provides accurate location of the secondary reflector 6 with respect to the planar array of antenna elements 8. Furthermore, the conductive support wall 5 prevents spurious radiation from the planar array of antenna elements 8.

The secondary reflector 6 acts as a feed for the primary reflector dish 10, as described in connection with FIG. 1.

In the embodiment described, the electrically conductive reflector member 7 is metallic and formed as one piece, comprising the secondary reflector 6 and the conductive support wall 5. This arrangement provides reduced metallic interfaces than would result if the secondary reflector were connected to a separate support structure, thereby reducing sources of passive intermodulation interference. As may be seem in FIG. 2, the conductive support block 9 has a side face 13 perpendicular to the planar array of antenna elements 8, the conductive support wall 5 of the electrically conductive reflector member 7 being held against the side face by a fixing member 14, such as one or more screws.

As can be seen in FIG. 2, a protrusion 12 from the side face 13 is configured to limit movement of the conductive support wall 5 in a direction perpendicular to the planar array of antenna elements 8 in a direction generally towards the primary reflector dish 10. This arrangement provides for precise location of the electrically conductive reflector member 7 with respect to the planar array of antenna elements 8, and in particular allows precise control of the distance between the planar array 8 and the secondary reflector 6 to a small fraction of the wavelength of the radiofrequency transmissions which the offset Gregorian antenna arrangement is configured to transmit and/or receive. Furthermore, extension of the conductive support wall 5 in a direction generally away from the secondary reflector 6 beyond the face of the conductive support block 9 avoids an interface aligned with the face of the conductive support block 9 facing the secondary reflector 6, which may allow spurious radiation.

In an example, the electrically conductive reflector member 7 is formed by casting and the end of the electrically conductive support wall 5 furthest from the secondary reflector 6 comprises a machined surface configured to abutt against a corresponding machined surface of the protrusion 12, whereby to locate the secondary reflector 6 in a predetermined position with respect to the planar array of antenna elements 8. This arrangement allows manufacture of the electrically conductive reflector member 7 to sufficient tolerance to give precise control of the distance between the planar array 8 and the secondary reflector 6. Typically, the electrically conductive reflector member 7 is electrically connected to the feed support member 15. This arrangement reduces spurious electromagnetic radiation.

Figure 3:
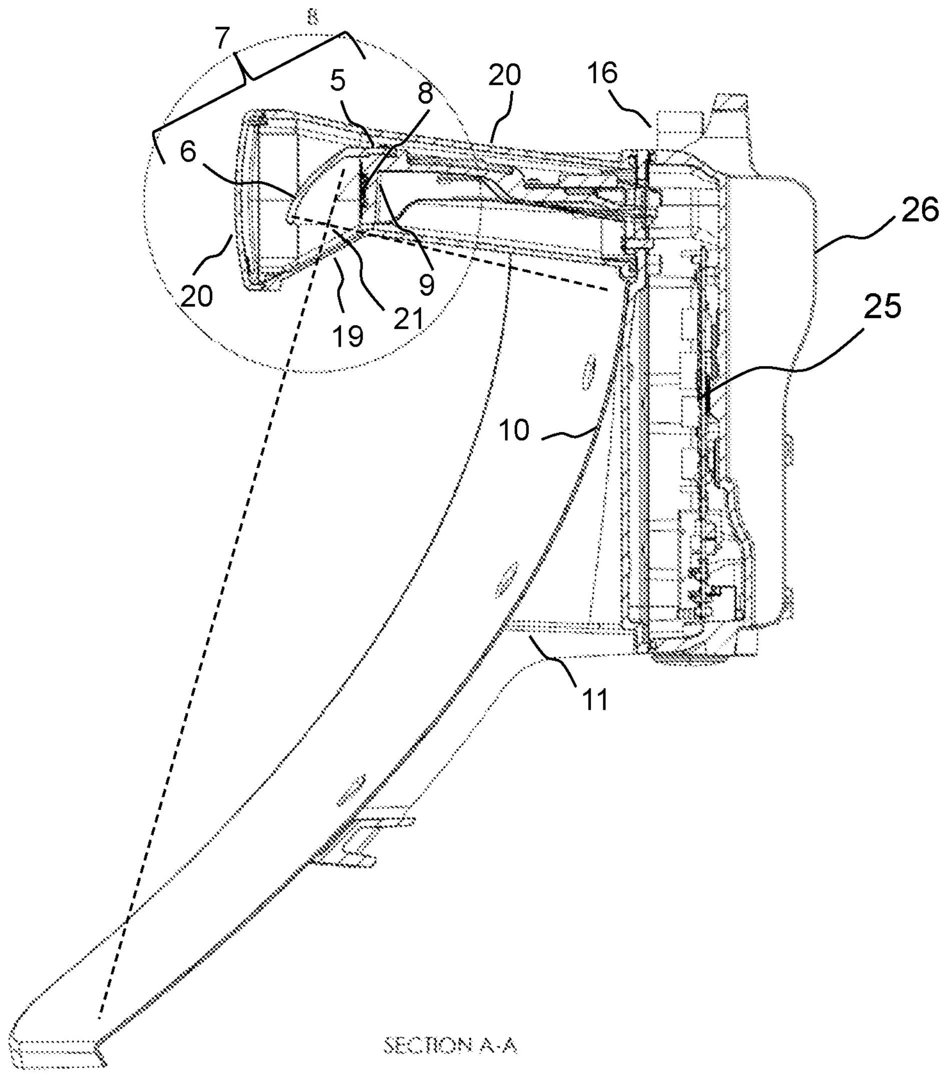
FIG. 3 shows a cross-section of the offset Gregorian antenna arrangement.

FIG. 3 shows a cross-section of a wireless transceiver having an offset Gregorian antenna arrangement in an example. The view of FIG. 3 comprises a cross-sectional view, showing parts that would be visible if the transceiver were cut in addition to showing cut edges. This view shows a radio transceiver circuit board 25 and radio transceiver enclosure 26, and also a non-conductive enclosure 20 surrounding the feed of the offset Gregorian antenna arrangement. The non-conductive enclosure forms a radome to allow the transmission and/or reception of signals while providing environmental protection to the feed. In an example, the non-conductive enclosure is composed of polycarbonate, which provides a combination of low radiofrequency signal loss and environmental stability.

It can be seen from FIG. 3 that the non-conductive enclosure 20 configured to encloses the electrically conductive reflector member 7, the planar array of antenna elements 8, and the conductive support block 9 but does not enclose the primary reflector dish 10. This arrangement confines radiation through the non-conductive enclosure to a small section of the enclosure, which may be made thin-walled without compromising mechanical strength, to reduce radiofrequency signal loss for signals passing through the enclosure.

As can be seen in the example of FIG. 3, the non-conductive enclosure 20 has a thin-walled section 19 directly in the line of sight between the primary reflector dish 10 and the electrically conductive reflector member 7. In this example, the thin-walled section 19 is less than half a wavelength in thickness at an operating frequency of the offset Gregorian antenna arrangement. Typically, the thin-walled section has a thickness that is half the thickness or less of typical sections of the enclosure away from the thin-walled section. The thin-walled section may have a thickness that is half the thickness or less of the average thickness of walls of the enclosure other than the thin-walled section.

This arrangement reduces radiofrequency signal loss for signals passing through the enclosure.

As can be seen in FIG. 3, the focus 21 of the offset Gregorian antenna arrangement is located between the thin walled section 19 of the enclosure and the electrically conductive reflector member 7. This allows a reduced size of the thin-walled section, reducing a reduction in the mechanical strength of the enclosure.

As can also be seen in FIG. 3, the focus 21 of the offset Gregorian antenna arrangement is located closer to the thin-walled section 19 of the enclosure than to the electrically conductive reflector member 7. This allows a particularly reduced size of the thin-walled section 19, by disposing the thin-walled section in a position in which the radiofrequency radiation is spread over a small area.

Figure 4:
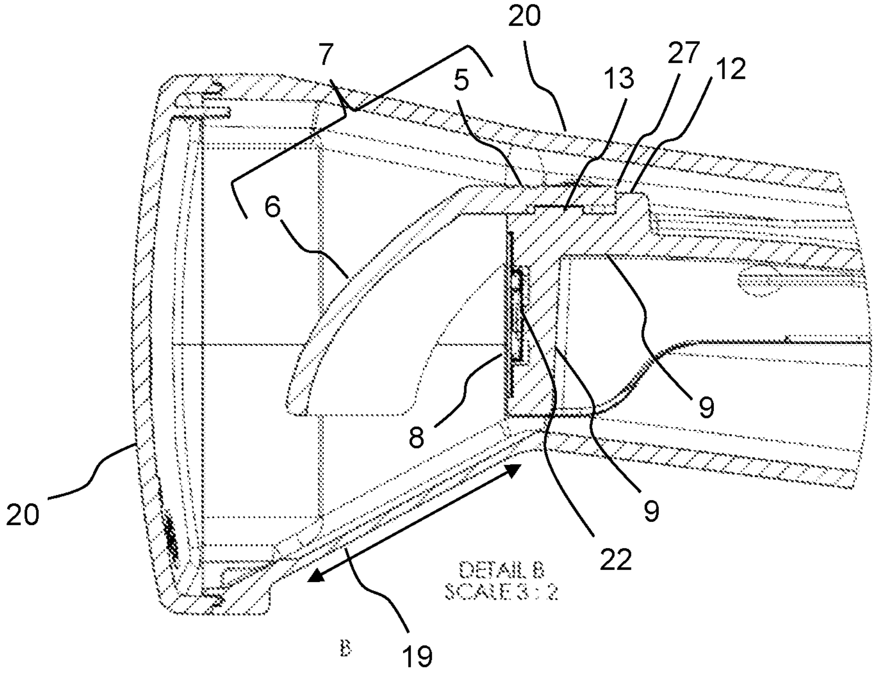
FIG. 4 shows a cross-section of the feed arrangement for the offset Gregorian antenna arrangement.

FIG. 4 shows the section of FIG. 3 labelled "B" at greater magnification. In particular, the mounting arrangement of the electrically conductive reflector member 7 to the conductive support block 9 is shown. It can be seen from FIG. 4 that the conductive support block 9 has a side face 13 perpendicular to the planar array of antenna elements 8. The fixing member holding the conductive support wall 5 of the electrically conductive reflector member 7 being held against the side face 13 is not shown in the cross-section of FIG. 5. The protrusion 12 from the side face 13 is shown, and it can be seen that it is configured to limit movement of the conductive support wall 5 in a direction perpendicular to the planar array of antenna elements 8. Also, it can be seen from FIG. 4 that the end of the electrically conductive support wall 5 furthest from the secondary reflector comprises a surface 27 configured to abut against a corresponding surface of the protrusion 12, to locate the secondary reflector 6 in a predetermined position with respect to the planar array of antenna elements 8.

Figure 5:
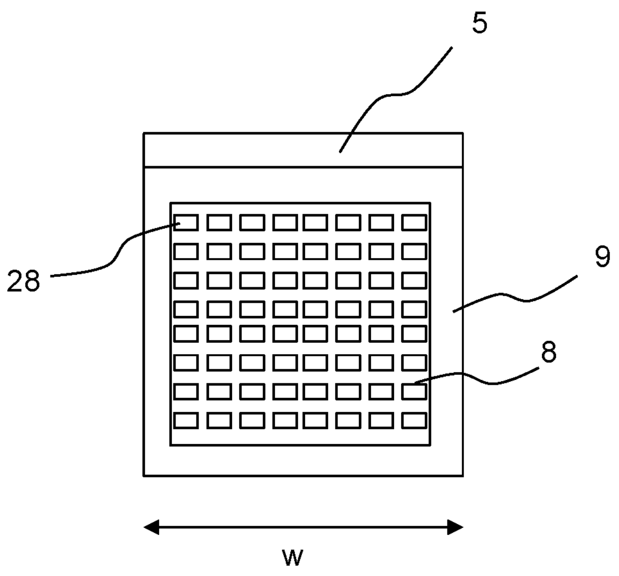
FIG. 5 shows a plan view of the planar array of antenna elements and the conductive support block, in relation to a cross-section of the conductive support wall in the plane of the array of antenna elements.

FIG. 5 shows an example of a plan view of the planar array of antenna elements 8 and the conductive support block 9, in relation to a cross-section of the conductive support wall 5 in the plane of the array of antenna elements. In this example, there is a rectangular array of antenna elements, in this case an 8×8 array is shown, each antenna element comprising a patch antenna element 28. Typically, the spacing between patch antenna elements is approximately half a wavelength at an operating frequency of the antenna arrangement, in this example approximately 60 GHz. Other configurations of antenna elements may be used. It can be seen that the conductive support wall 5 typically extends across the width w of the support block 9, the width w of the support block being measured in a plane parallel to the substantially flat support wall 5. The array of antenna elements 8 is formed as a rectangular array of patch antenna elements 28 on a substrate such a printed circuit board or ceramic tile. The conductive support block 9 is configured to support the substrate. The substrate, in the example of FIG. 4, carries a radiofrequency integrated circuit comprising a beamformer, the radiofrequency integrated circuit being on the opposite side of the substrate from the side on which the array of patch antenna elements is formed, the conductive support block 9 being provided with a recess 22 to accommodate the radiofrequency integrated circuit. This arrangement provides effective electromagnetic shielding of the radiofrequency integrated circuit.

Figure 6A:
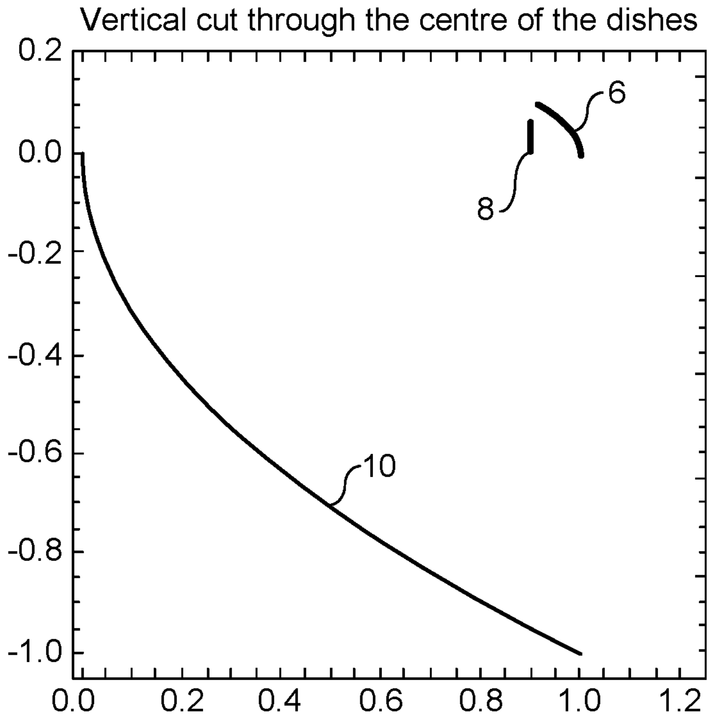
FIGS. 6*a* and 6*b* are schematic diagrams showing the shape the primary reflector dish and the secondary reflector in a cross-section in a vertical and horizontal cross-section respectively.
Figure 6B:
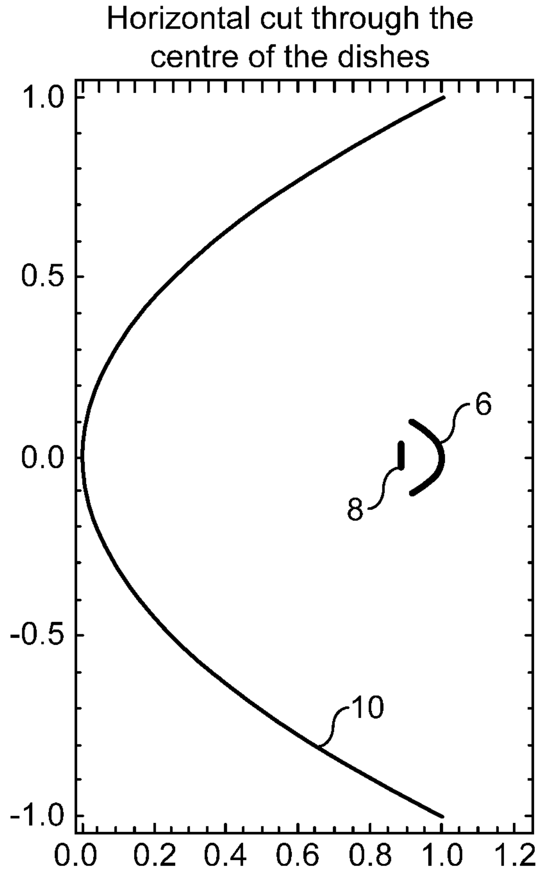

FIG. 6*a* shows a typical profile, in a vertical cross-section through the offset Gregorian antenna arrangement, in a similar plane to that of the cross-section of FIG. 3. The reflector surfaces are shown of the primary reflector dish 10 and the secondary reflector 6. A practical implementation may comprise reduced sections of the theoretical curves shown in FIGS. 6*a* and 6*b*. The planar array of antenna elements 8 is also shown. FIG. 6*b* shows a typical profile, in a horizontal cross-section through the offset Gregorian antenna arrangement, again showing the reflector surfaces of the primary reflector dish 10 and the secondary reflector 6, and the planar array of antenna elements 8. The primary reflector dish 10 has a parabolic shape in both the vertical and horizontal cross-sections. The secondary reflector dish 6 also has a parabolic shape in both the vertical and horizontal cross-sections.

Figure 7:
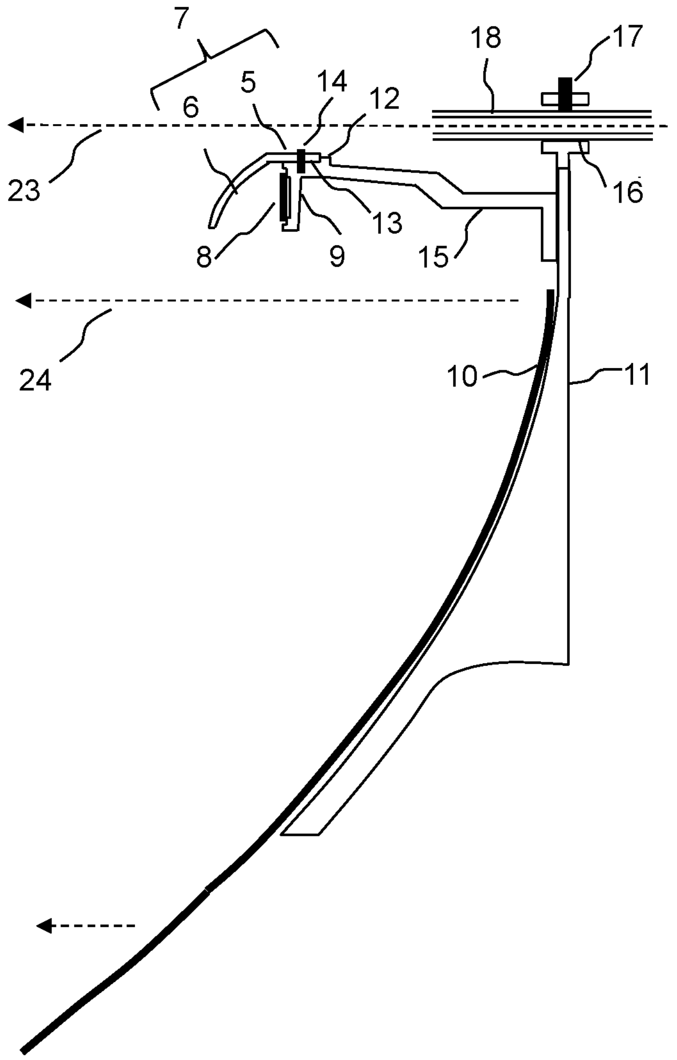
FIG. 7 is a schematic diagram showing a wireless transceiver having the offset Gregorian antenna arrangement and having a visual alignment tube.

FIG. 7 is a schematic diagram showing an offset Gregorian antenna arrangement having a visual alignment tube 18. In an example shown in FIG. 7, the support body 11, which in this example is an aluminium casting forms a mechanical basis for mounting the antenna arrangement, comprises an aperture 16 having an axis 23 parallel to the direction 24 of a radiofrequency main beam which the offset Gregorian antenna arrangement is configured to form, the aperture providing a line of sight along the axis 23. The aperture 16 is arranged to accept a hollow tube 18 and to hold the hollow tube 18 in alignment with the aperture 16. The aperture may have a v-section groove and a thread to accept a grub screw 17 configured to bear against the tube 18, to allow visual alignment of the offset Gregorian antenna arrangement with another radio station of the wireless communication network. The hollow tube allows visual alignment of the offset Gregorian antenna arrangement with another radio station of the wireless communication network by an installer, to an accuracy, typically of approximately +/−2 degrees, sufficient that the other radio station is within a range of angular directions over which a beam from the antenna arrangement may be electronically steered to provide more accurate alignment of the beam.

Figure 8:
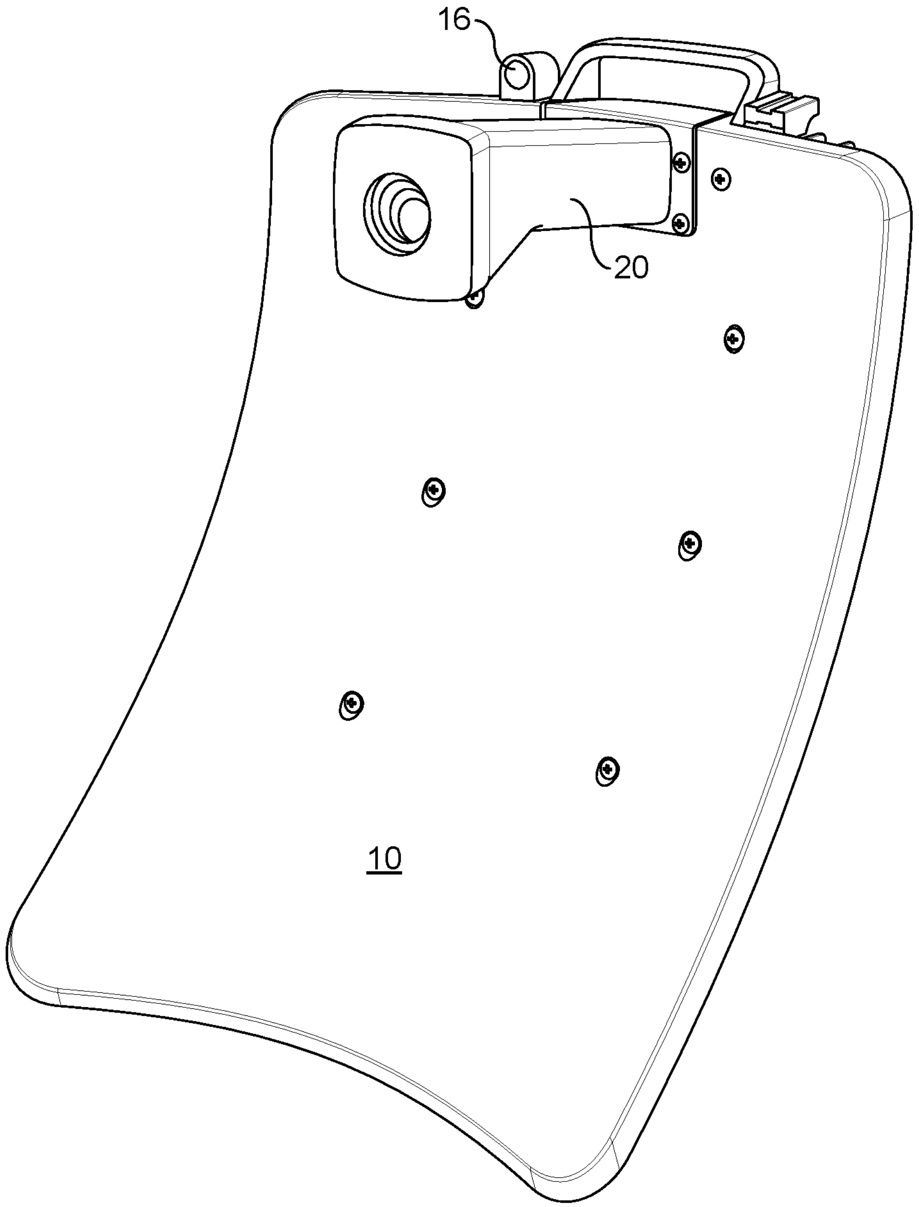
FIG. 8 shows an oblique perspective view of a wireless transceiver having the offset Gregorian antenna arrangement.

FIG. 8 shows an oblique perspective view of a wireless transceiver having the offset Gregorian antenna arrangement in an example, showing the aperture 16 for holding the alignment tube, the primary reflector dish 10, and the non-conductive enclosure 20.

Figure 9:
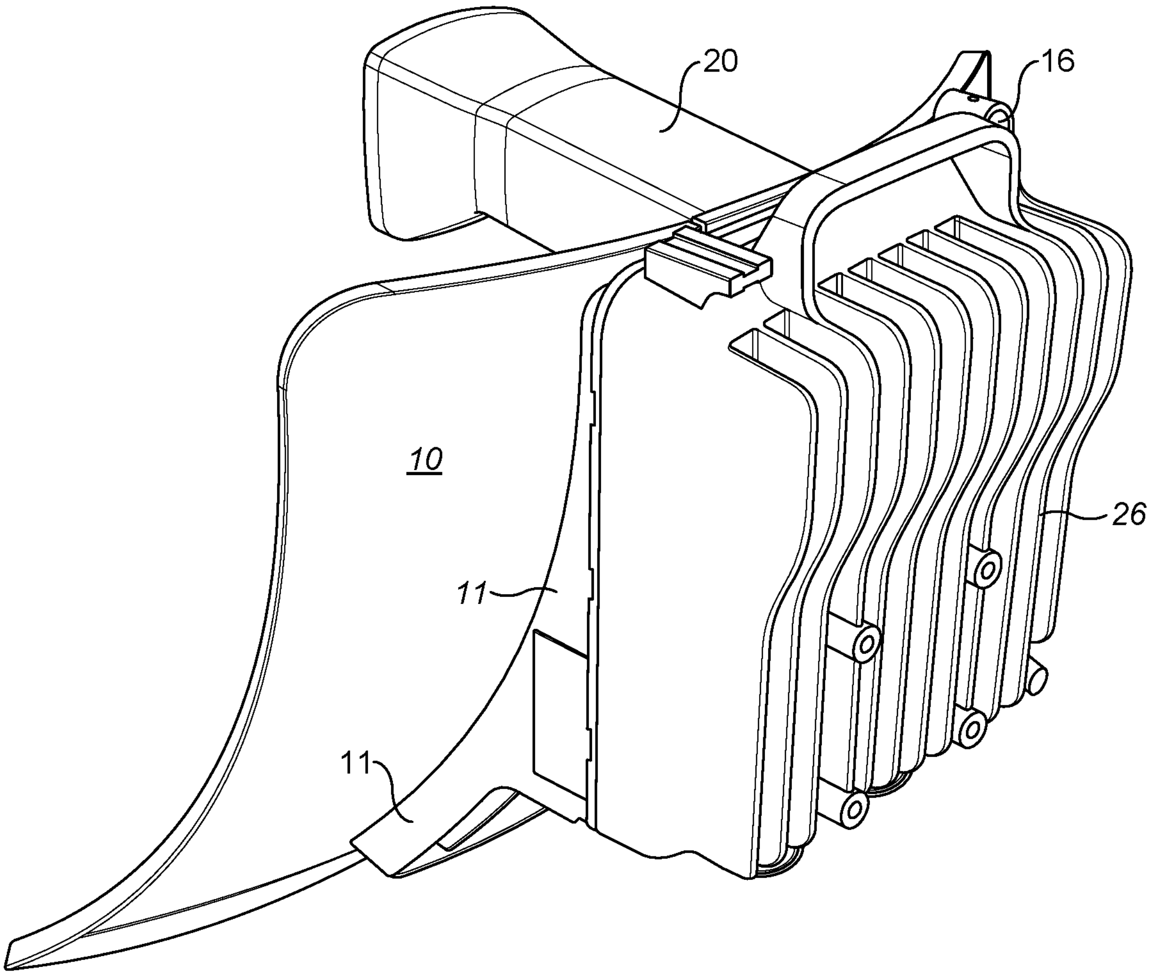
FIG. 9 shows a further oblique perspective view of the wireless transceiver having the offset Gregorian antenna arrangement.

FIG. 9 shows a further oblique perspective view of the wireless transceiver having the offset Gregorian antenna arrangement, also showing the aperture 16 for holding the alignment tube, the primary reflector dish 10, and the non-conductive enclosure 20. In addition, the support body 11 and radio transceiver enclosure 26 are shown.

Figure 10:
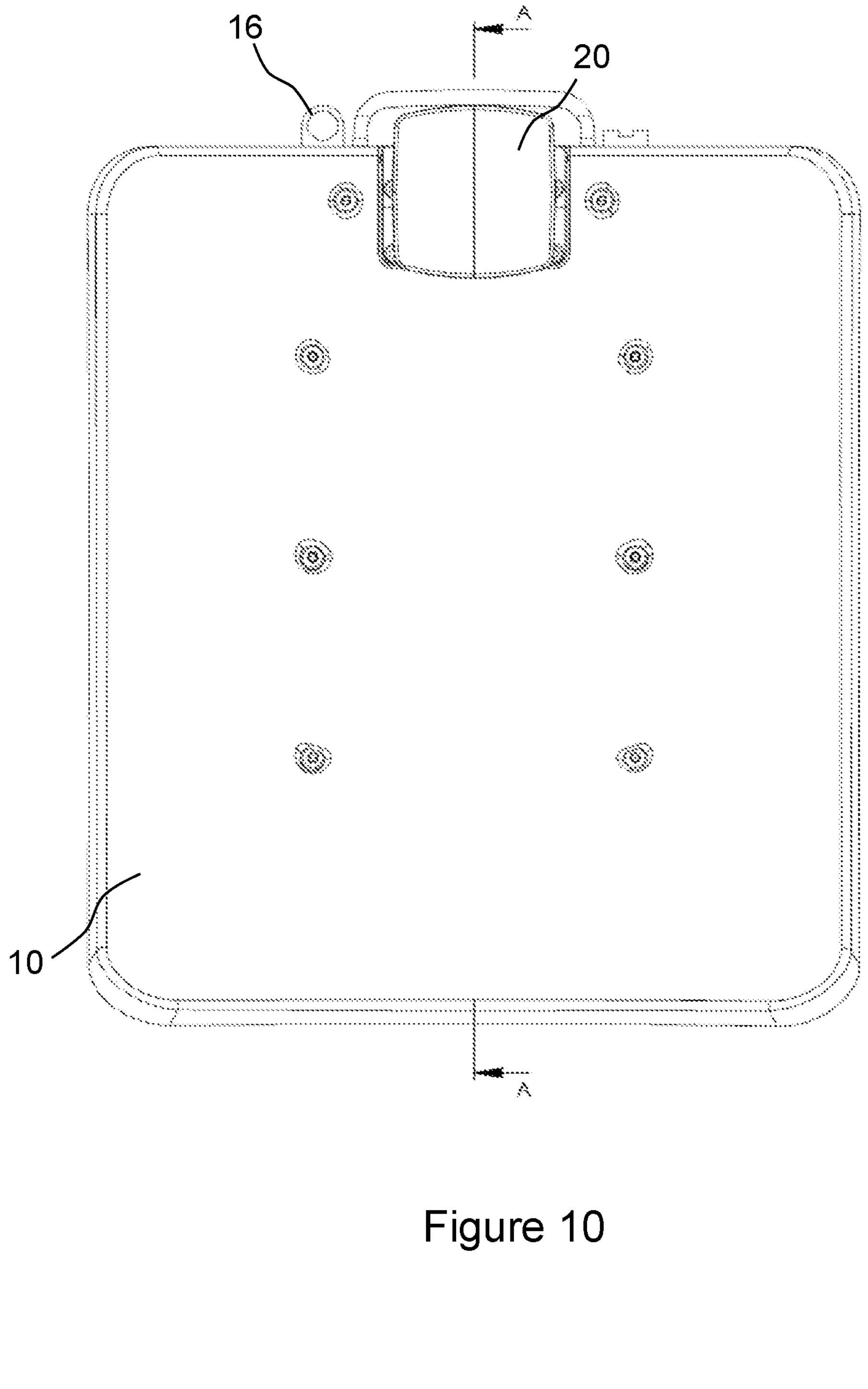
FIG. 10 is a plan view of the wireless transceiver, viewed from the direction of a radiofrequency main beam which the offset Gregorian antenna arrangement is configured to form.

FIG. 10 is a plan view of the offset Gregorian antenna arrangement, viewed from the direction of a radiofrequency main beam which the offset Gregorian antenna arrangement is configured to form, in an example. It can be seen that the primary reflector dish 10 is substantially rectangular in plan view, viewed from a direction parallel to the direction of a radiofrequency main beam which the offset Gregorian antenna arrangement is configured to form. The primary reflector dish may be formed of pressed metal. This arrangement has been found to provide a compact design with high radiofrequency gain. The aperture 16 for holding the alignment tube and the primary the non-conductive enclosure 20 are also shown in FIG. 10.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A wireless transceiver for a wireless communication network, the wireless
transceiver having an offset Gregorian antenna arrangement comprising:
- a primary reflector dish;
- a secondary reflector;
- a support body configured to support the primary reflector dish;
- a planar array of antenna elements arranged as a feed for transmitting radio frequency signals to the secondary reflector and/or for receiving radio frequency signals from the secondary reflector; and
- a conductive support block configured to support the planar array of antenna elements,
- wherein the conductive support block is formed as a first end of a feed support member, the feed support member being directly connected, at an end opposite the first end, to the support body,
- wherein the support body comprises an aperture having an axis parallel to the direction of a radiofrequency main beam which the Gregorian antenna arrangement is configured to form, the aperture providing a line of sight along the axis, and
- wherein the aperture is configured to accept a hollow tube and to hold the hollow tube in alignment with the aperture, whereby to allow visual alignment of the offset Gregorian antenna arrangement with a radio station of the wireless communication network.

2. The wireless transceiver of claim 1, wherein the electrically conductive reflector member is metallic and formed as one piece.

3. The wireless transceiver of claim 2, wherein the conductive support block has a side face perpendicular to the planar array of antenna elements, the conductive support wall of the electrically conductive reflector member being held against the side face by a fixing member,
- wherein a protrusion from the side face is configured to limit movement of the conductive support wall in a direction perpendicular to the planar array of antenna elements in a direction towards the primary reflector dish.

4. The wireless transceiver of claim 3,
- wherein the electrically conductive reflector member is formed by casting and the end of the electrically conductive support wall furthest from the secondary reflector comprises a machined surface configured to abutt against a corresponding machined surface of the protrusion, whereby to locate the secondary reflector in a predetermined position with respect to the planar array of antenna elements.

5. The wireless transceiver of claim 1 comprising a non-conductive enclosure configured to enclose the electrically conductive reflector member, the planar array of antenna elements, and the conductive support block, and not to enclose the primary reflector dish.

6. The wireless transceiver of claim 5, wherein the non-conductive enclosure has a thin-walled section directly in the line of sight between the primary reflector dish and the electrically conductive reflector member, the thin-walled section being less than half a wavelength in thickness at an operating frequency of the offset Gregorian antenna arrangement.

7. The wireless transceiver of claim 6, wherein the focus of the offset Gregorian antenna arrangement is located between the thin walled section of the enclosure and the electrically conductive reflector member.

8. The wireless transceiver of claim 7, wherein the focus of the offset Gregorian antenna arrangement is located closer to the thin-walled section of the enclosure than to the electrically conductive reflector member.

9. The wireless transceiver of claim 5, wherein the non-conductive enclosure is composed of polycarbonate.

10. The wireless transceiver of claim 1, wherein the primary reflector dish is substantially rectangular in plan view, viewed from a direction parallel to the direction of a radiofrequency main beam which the offset Gregorian antenna arrangement is configured to form.

11. The wireless transceiver of claim 1 suitable for operation at a frequency of 60 GHz.

12. The wireless transceiver of claim 1, wherein the feed support member is a cast metallic arm.

13. The wireless transceiver of claim 1, comprising:
- an electrically conductive reflector member comprising the secondary reflector and a conductive support wall,
- wherein the conductive support wall is connected directly to the conductive support block.

14. The wireless transceiver of claim 13, wherein the conductive support wall is configured to be substantially perpendicular to the planar array of antenna elements.

* * * * *